US005523363A

United States Patent [19]

Fujibayashi et al.

[11] Patent Number: 5,523,363
[45] Date of Patent: Jun. 4, 1996

[54] RESIN COMPOSITION FOR AQUEOUS COATING

[75] Inventors: Toshio Fujibayashi; Haruo Nagaoka, both of Hiratsuka, Japan

[73] Assignee: Kansai Paint Co., Ltd., Hyogo, Japan

[21] Appl. No.: 122,561

[22] PCT Filed: Jan. 28, 1993

[86] PCT No.: PCT/JP93/00102

§ 371 Date: Sep. 30, 1993

§ 102(e) Date: Sep. 30, 1993

[87] PCT Pub. No.: WO93/15157

PCT Pub. Date: Aug. 5, 1993

[30] Foreign Application Priority Data

Jan. 31, 1992 [JP] Japan ................... 4-040594

[51] Int. Cl.$^6$ ................... C08F 283/00; C08K 3/20
[52] U.S. Cl. ................... 525/481; 525/423; 525/526; 525/532; 525/533; 523/403; 523/404; 523/410; 523/414
[58] Field of Search ................... 525/117, 481, 525/526, 423, 532, 533; 523/403, 404, 410, 414

[56] References Cited

U.S. PATENT DOCUMENTS

| | | | |
|---|---|---|---|
| 2,450,940 | 10/1948 | Cowan et al. | 260/404.5 |
| 3,340,088 | 9/1968 | Hart | 204/181 |
| 3,891,529 | 6/1975 | Beesch | 204/195 S |
| 3,937,679 | 2/1976 | Bosso et al. | 260/29.3 |
| 3,963,663 | 6/1976 | Sekmakas | 260/29.3 |
| 3,975,340 | 8/1976 | Manaka | 526/312 |
| 5,139,631 | 8/1992 | Mishida et al. | 525/526 |
| 5,147,906 | 9/1992 | Nashida et al. | 525/526 |

FOREIGN PATENT DOCUMENTS

| | | |
|---|---|---|
| 0315164 | 5/1989 | European Pat. Off. . |
| 0356970 | 3/1990 | European Pat. Off. . |
| 0384398 | 8/1990 | European Pat. Off. . |
| 0387878 | 9/1990 | European Pat. Off. . |
| 0591984 | 4/1994 | European Pat. Off. . |
| 45-12396 | 5/1970 | Japan . |
| 45-12395 | 5/1970 | Japan . |
| 49-23087 | 6/1974 | Japan . |
| 59-36123 | 2/1984 | Japan . |
| 60-166675 | 8/1985 | Japan . |
| 60-161973 | 8/1985 | Japan . |
| 60-170620 | 9/1985 | Japan . |
| 2-69578 | 12/1985 | Japan . |
| 60-260664 | 12/1985 | Japan . |
| 62-135467 | 6/1987 | Japan . |
| 2-265975 | 10/1990 | Japan . |
| 51-130498 | 10/1990 | Japan . |
| 2-503572 | 10/1990 | Japan . |
| 1306101 | 2/1973 | United Kingdom . |
| 1327071 | 8/1973 | United Kingdom . |

*Primary Examiner*—Melvyn I. Marquis
*Assistant Examiner*—Randy Gulakowski
*Attorney, Agent, or Firm*—Wenderoth, Lind & Ponack

[57] ABSTRACT

A resin composition for aqueous coating, comprising, as the main components, a resin having hydroxyl group(s) and cationic group(s) and a certain novolac-substituted phenol type epoxy resin. This composition has excellent bath stability and low-temperature curability and is useful in cationic electrocoatings, in particular.

11 Claims, No Drawings

RESIN COMPOSITION FOR AQUEOUS COATING

TECHNICAL FIELD

The present invention relates to a resin composition for aqueous coating useful in cationic electrocoatings, in particular.

BACKGROUND OF THE ART

Resin compositions for cationic electrocoatings each comprising, as the main components, a polyamine resin (e.g. amino-epoxy resin adduct) and a blocked polyisocyanate compound have been used in a large amount for their excellency in corrosion resistance, etc. These compositions, however, have various problems as listed below and solutions thereof are required strongly.

(1) They begin to cure at a temperature of 170° C. or more, which is too high.

(2) When they are heated at high temperatures, the blocked polyisocyanate compound causes thermal decomposition, which generates a resinous tar and soot, allows the top coating film to give rise to yellowing, bleeding and insufficient curing, gives significantly reduced weather resistance and tends to cause whitening.

(3) When an organotin compound is added to them as a catalyst for lowering the initial temperature of curing, the compound poisons catalysts for exhaust gas combustion in some cases.

Resins for self-crosslinking electrocoatings using no curing agent having the above-mentioned problem are also known and were proposed in, for example, Japanese Patent Publication No. 23807/1974 (GB-A-1327071), Japanese Patent Publication No. 31736/1974 (GB-A-1306101, GB-A-1306102), Japanese Laid-Open Patent Application No. 13432/1972 (US-A-3975346) and Japanese Laid-Open Patent Application No. 69896/1973 (US-A-3937679). All of these resins have a problem that they do not satisfy both of the bath stability and film curability of electrocoating. Specifically explaining, most common epoxy compounds of glycidyl ether type, for example, bisphenol A glycidyl ether and novolac phenyl polyglycidyl ether have excellent curability but inferior bath stability.

A composition using, as the curing agent, an epoxy resin having an alicyclic skeleton and/or a bridged alicyclic skeleton, proposed in Japanese Laid-Open Patent Application No. 255874/1990 (EP-A-356970), achieved most or-the objects intended therein but is insufficient in film properties when baking was conducted at low temperature for a short period of time.

The present inventors made a further study with a main aim of developing a resin composition for aqueous coating useful particularly in cationic electrocoatings, which does not use any of a blocked polyisocyanate compound, an organotin compound, etc. and which is free from the abovementioned problems.

As a result, the present inventors found that a resin composition for aqueous coating, which comprises a particular novolac-substituted phenol type epoxy resin as a curing agent, has improved storage stability in electrocoating bath owing to the reduced reactivity with acid or hydroxyl group and, as compared with epoxy resins containing an alicyclic skeleton and/or a bridged alicyclic skeleton, has excellent low-temperature curability. This finding has led to the completion of the present invention.

According to the present invention, it is not necessary to use any of a blocked polyisocyanate compound, an organotin compound, etc. and all of the abovementioned problems caused by the use of said compounds can be solved.

SUMMARY OF THE INVENTION

The present invention provides a resin composition for aqueous coating characterized by comprising, as the main components (A) a resin having hydroxyl group(s) and cationic group(s), and (B) a novolac-substituted phenol type epoxy resin represented by the following general formula (I)

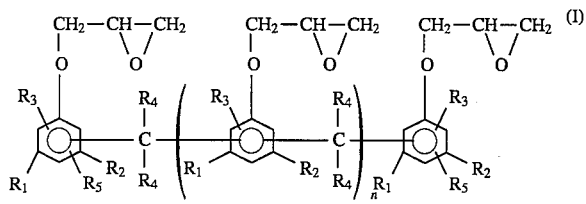

wherein $R_1$s and $R_2$s may be the same or different and are each a group selected from a hydrogen atom, an alkyl group of 1–8 carbon atoms, an aromatic group and a halogen atom, $R_3$s may be the same or different and are each a group selected from an alkyl group of 1–10 carbon atoms, an aromatic group, an aryl group and a halogen atom, $R_4$s may be the same or different and are each a group selected from a hydrogen atom and an alkyl group of 1–4 carbon atoms, $R_5$s may be the same or different and are each a group selected from a hydrogen atom, an alkyl group of 1–10 carbon atoms, an aromatic group, an aryl group and a halogen atom, n is an integer of 0–38, and part of the benzene rings in the formula may be replaced by naphthalene ring(s).

The present invention further provides a cationic electrocoating containing the above resin composition of the present invention for aqueous coating and a coated article which is coated with the cationic electrocoating.

The film formed by electrocoating a cationic electrocoating comprising the resin composition of the present invention for aqueous coating can be cured at a temperature of about 250° C. or less. When the resin composition contains at least one organometal type curing catalyst (C) selected from organolead compounds, organozirconium compounds, organocobalt compounds, organoaluminum compounds, organocopper compounds, organozinc compounds, organoiron compounds, organobismuth compounds and organonickel compounds, said film can be cured at a temperature as low as about 70°–160° C. These curing reactions are presumed to proceed as follows. The epoxy groups in the epoxy resin (B) cause ring opening, followed by etherification with the hydroxyl group(s) [preferably, primary hydroxyl group(s)] in the resin (A); further said epoxy groups in the epoxy resin (B) combine with each other to form ether bonds; thus, a crosslinked structure is formed.

The resin composition of the present invention for aqueous coating has the following technical advantages.

(1) Film curing is possible at a temperature of 160° C. or less although no tin catalyst is used. Therefore, the abovementioned problems caused by the use of a tin catalyst can be eliminated.

(2) No blocked polyisocyanate compound is required. Therefore, the above-mentioned problems caused by the use of a blocked polyisocyanate compound can be eliminated.

(3) Since there is no volume contraction due to thermal decomposition, the cured coating film has good surface smoothness.

(4) Since neither urethane bond nor aromatic urea bond is contained in the crosslinked structure of the cured coating film, the coating film has sufficient weatherability.

(5) The cured coating film is excellent in corrosion resistance, curability, etc.

(6) Gives an electrocoating bath of excellent stability.

The components constituting the resin composition for aqueous coating according to the present invention are described in more detail below.

DETAILED DESCRIPTION OF THE INVENTION

Component (A): a resin having hydroxyl group(s) and cationic group(s) in the molecule This resin has hydroxyl group(s) capable of reacting with the epoxy groups of the component (B) described later and cationic group(s) necessary for the formation of a stable aqueous dispersion. Specific examples of the resin include the following.

(1) A product obtained by reacting a polyepoxy resin with a cationizing agent.

(2) A product obtained by protonating a polycondensate between a polycarboxylic acid and a polyamine (U.S. Pat. No. 2,450,940), with an acid.

(3) A composition comprising a product obtained by protonating a polyaddition product between a polyol and a mono- or polyamine with an acid and a polyisocyanate compound.

(4) A product obtained by protonating an acrylic or vinyl resin having hydroxyl group(s) and amino group(s), with an acid (Japanese Patent Publication No. 12395/1970 and Japanese Patent Publication No. 12396/1970).

(5) A product obtained by protonating an adduct between a polycarboxylic acid resin and an alkyleneimine with an acid (U.S. Pat. No. 3,403,088).

The details of these resins and their production processes are described in, for example, Japanese Patent Publication No. 12395/1970, Japanese Patent Publication No. 12396/1970, Japanese Patent Publication No. 23087/1974, U.S. Pat. No. 2,450,940, U.S. Pat. No. 3,403,088, U.S. Pat. No. 3,891,529, U.S. Pat. No. 3,963,663. Therefore, the description is not repeated herein.

In the present invention, the component (A) includes, as a preferable example, a resin obtained by reacting:

(A-1) an epoxy resin having, in the molecule, at least three epoxy group-containing functional groups each represented by the following structural formula (II)

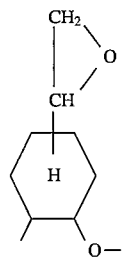

(A-2) an amino compound having at least one primary hydroxyl group in the molecule, and (A-3) a phenyl compound having at least one phenolic hydroxyl group in the molecule.

The components (A-1), (A-2) and (A-3) used in production of the above preferable resin are described in detail below.

Component (A-1): an epoxy resin having, in the molecule, at least three epoxy group-containing functional groups represented by the above structural formula (II).

As the component (A-1), there can be used per-se-known resins described in, for example, Japanese Laid-Open Patent Application No. 170620/1985, Japanese Laid-Open Patent Application No. 135467/1987, Japanese Laid-Open Patent Application No. 166675/1985 and Japanese Laid-Open Patent Application No. 161973/1985.

The component (A-1) further includes those in which a residue of a polymerization-initiating component, i.e. a residue of an active-hydrogen-containing organic compound is bonded to the end of the above structural formula (II). As the active-hydrogen-containing organic compound which is a precursor of said residue, there can be mentioned, for example, an alcohol, a phenol, a carboxylic acid, an amine and a thiol. The alcohol may be a monohydric or polyhydric alcohol and can be exemplified by aliphatic monohydric alcohols such as methanol, ethanol, propanol, butanol, pentanol, hexanol, octanol and the like; aromatic monohydric alcohols such as benzyl alcohol and the like; and polyhydric alcohols such as ethylene glycol, diethylene glycol, triethylene glycol, polyethylene glycol, propylene glycol, dipropylene glycol, 1,3-butanediol, 1,4-butanediol, pentanediol, 1,6-hexanediol, neopentyl glycol, oxypivalic acid-neopentyl glycol ester, cyclohexanedimethanol, glycerine, diglycerine, polyglycerine, trimethylolpropane, trimethylolethane, pentaerythritol, dipentaerythritol and the like.

As the phenol, there can be mentioned, for example, phenol, cresol, catechol, pyrogallol, hydroquinone, hydroquinone monomethyl ether, bisphenol A, bisphenol F, 4,4-dihydroxybenzophenone, bisphenol S, a phenolic resin and a cresol novolac resin.

The carboxylic acid can be exemplified by formic acid, acetic acid, propionic acid, butyric acid, fatty acids of animal and vegetable oils, fumaric acid, maleic acid, adipic acid, dodecanedioic acid, trimellitic acid, pyromellitic acid, polyacrylic acid, phthalic acid, isophthalic acid and terephthalic acid. As the carboxylic acid, there can also be used compounds having hydroxyl group(s) and carboxyl group(s), such as lactic acid, citric acid, oxycaproic acid and the like.

As the active-hydrogen-containing organic compound, there can further be used a polyvinyl alcohol, a partial hydrolysis product of a polyvinyl acetate, starch, cellulose, cellulose acetate, cellulose acetate butyrate, hydroxyethyl cellulose, an allyl polyol resin, a styrene-alkyl alcohol copolymer, a styrene-maleic acid copolymer, an alkyd resin, a polyester polyol resin, a polycaprolactone polyol resin, etc. In the active-hydrogen-containing organic compound, unsaturated double bond(s) may be present in the skeleton together with the active hydrogen and the unsaturated double bond(s) may be epoxidized.

The component (A-1) can be obtained, for example, by subjecting 4-vinylcyclohexene-1-oxide alone or in the coexistence of other epoxy group-containing compound to ring-opening (co)polymerization by the epoxy group(s) contained therein, using the above-mentioned active-hydrogen-containing organic compound as an initiator to form a polyether resin, and then epoxidizing the vinyl groups of the 4-vinylcyclohexene-1-oxide portions present in the side chains of said resin, with an oxidizing agent such as peracid, hydroperoxide or the like to form functional groups each represented by the above structural formula (II).

The above 4-vinylcyclohexene-1-oxide can be obtained, for example, by subjecting butadiene to dimerization to form vinylcyclohexene and then subjecting it to partial epoxidization with a per acetic acid.

The other epoxy group-containing compound usable in the above copolymerization is not particularly restricted as long as it has epoxy group(s) but, from the viewpoint of easiness in production, is preferably a compound having one epoxy group in the molecule. It can be exemplified by α-olefin epoxides represented by the following formula:

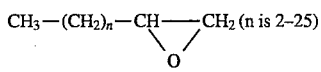

such as ethylene oxide, propylene oxide, butylene oxide and the like; oxides of unsaturated compounds, such as styrene oxide and the like; glycidyl ethers of hydroxyl group-containing compounds, such as allyl glycidyl ether, 2-ethylhexyl glycidyl ether, methyl glycidyl ether, butyl glycidyl ether, phenyl glycidyl ether and the like; and glycidyl esters of organic acids such as fatty acids and the like.

The other epoxy group-containing compound further includes vinyl monomers each having an alicyclic oxirane group having double bond(s). They can be exemplified by the followings.

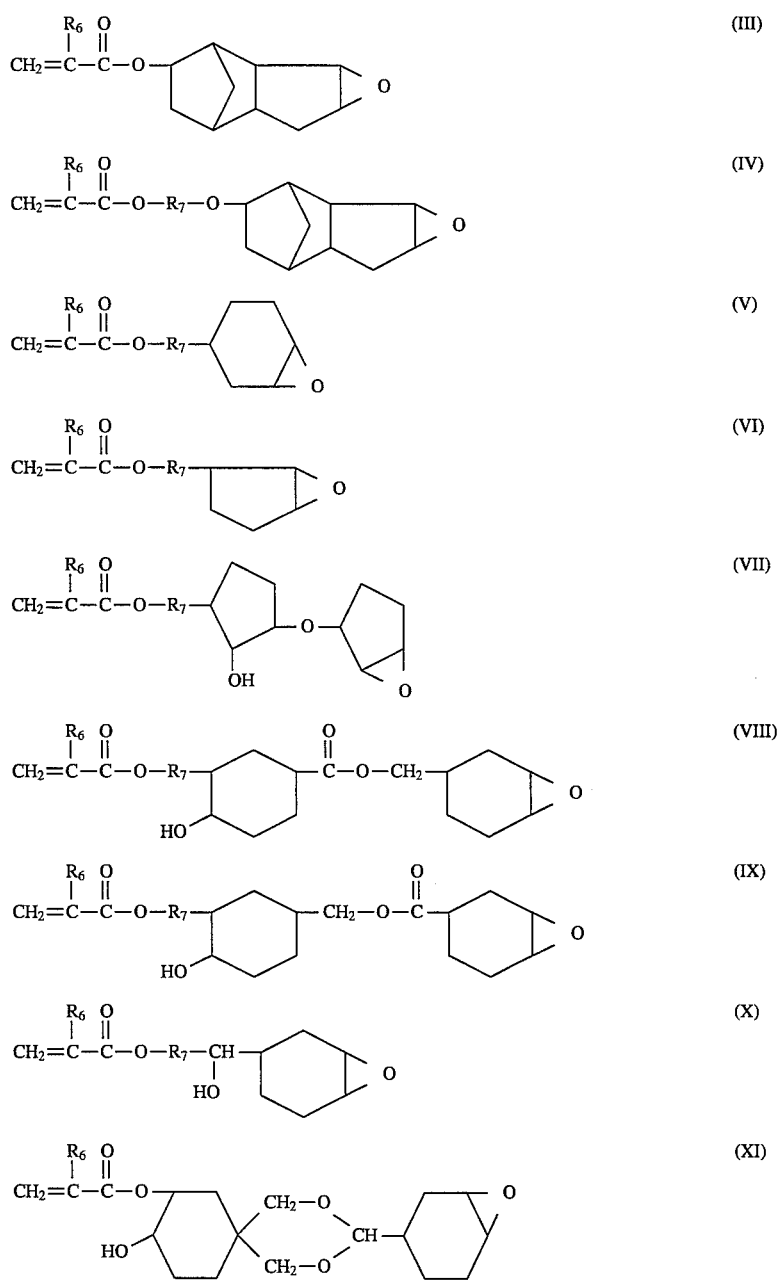

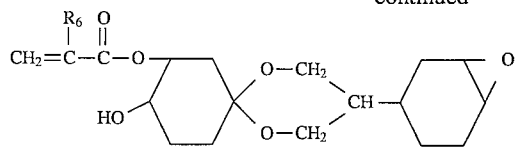 (XII)

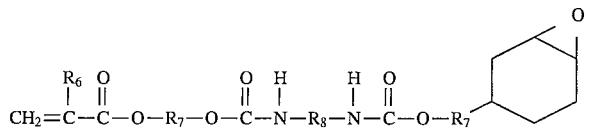 (XIII)

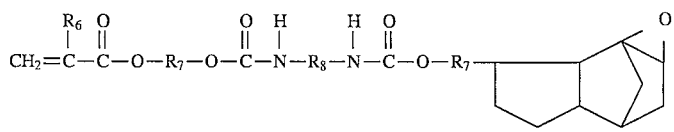 (XIV)

In each of the above formulas, $R_6$ represents a hydrogen atom or a methyl group, $R_7$ represents a bivalent aliphatic saturated hydrocarbon group of 1–6 carbon atoms, and $R_8$ represents a bivalent hydrocarbon group of 1–10 carbon atoms.

As the bivalent saturated hydrocarbon group of 1–6 carbon atoms, represented by $R_7$, there can be mentioned straight-chain or branched chain alkylene groups such as methylene, ethylene, propylene, tetramethylene, ethylethylene, pentamethylene, hexamethylene and the like. As the bivalent hydrocarbon group of 1–10 carbon atoms, represented by $R_8$, there can be mentioned, for example, methylene, ethylene, propylene, tetramethylene, ethylethylene, pentamethylene, hexamethylene, polymethylene,

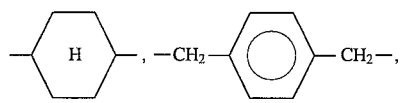

etc.

As the other epoxy group-containing compound, there can further be used compounds represented by the following general formula (XV)

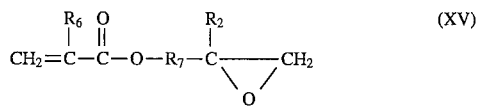 (XV)

($R_6$ and $R_7$ are as defined above), such as glycidyl acrylate, glycidyl methacrylate and the like; and compounds each having an alicyclic unsaturated group, such as compounds represented by the following formula (XVI)

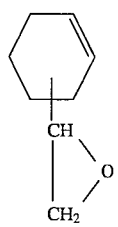 (XVI)

which is obtained as a by-product when vinylcyclohexene is subjected to partial epoxidization. There can furthermore be used 4-vinylcycloheptene (vinylnorbornene), etc.

The ring-opening (co)polymerization reaction by epoxy group, of 4-vinylcyclohexene-1-oxide alone or in the co-presence of other epoxy group-containing compound is preferably conducted using an active-hydrogen-containing organic compound and further a catalyst. As the catalyst, there can be mentioned, for example, amines such as methylamine, ethylamine, propylamine, piperazine and the like; organic bases such as pyridine, imidazole and the like; organic acids such as formic acid, acetic acid, propionic acid and the like; inorganic acids such as sulfuric acid, hydrochloric acid and the like; alkali metal alcoholates such as sodium methylate and the like; alkalis such as KOH, NaOH and the like; Lewis acids or complexes thereof such as $BF_3ZnCl_2$, $AlCl_3$, $SnCl_4$ and the like; organometal compounds such as triethyl aluminum, diethyl zinc and the like.

The catalyst can be used in an amount of 0.001–10% by weight, preferably 0.1–5% by weight based on the materials to be reacted. The appropriate temperature of the ring-opening (co)polymerization reaction is generally –70° C. to 200° C., preferably –30° C. to 100° C. The reaction can be conducted using a solvent. The solvent is preferably an ordinary organic solvent having no active hydrogen.

By the above reaction can be obtained a polyether resin [a ring-opening (co)polymer] having vinyl groups in the side chains. The vinyl groups are epoxidized to introduce functional groups each represented by the above-mentioned structural formula (II) into the polyether resin, whereby a component (A-1) can be obtained. This epoxidization can be conducted using a peracid, a hydroperoxide or the like. As the peracid, there can be used, for example, performic acid, peracetic acid, perbenzoic acid and trifluoroperacetic acid. As the hydroperoxide, there can be used, for example, hydrogen peroxide, tert-butyl peroxide and cumene peroxide. The epoxidization reaction can be conducted using a catalyst, as necessary.

Epoxidization of the vinyl groups of 4-vinylcyclohexane-1-oxide gives a functional group represented by the above structural formula (II). When in this epoxidization there co-exists, as the other epoxy group-containing compound, the above-mentioned compound having an alicyclic oxirane group, the vinyl group in the compound is epoxidized as well in some cases but gives a functional group different from that of the structural formula (II). The presence or absence of a solvent and reaction temperature used in the epoxidization reaction can be appropriately determined depending upon the equipment and raw materials used.

As the component (A-1), there can also be used commercial products, for example, EHPE 3150 (trade name) manufactured by DAICEL CHEMICAL INDUSTRIES, LTD. This product is obtained by subjecting 4-vinylcyclohexene-1oxide to ring-opening polymerization and epoxidizing the vinyl groups in the resulting polymer, and has a polymerization degree of 4–15 on an average.

The amount of the epoxy group-containing functional group represented by the structural formula (II), in the component (A-1) is at least three in terms of the number of the functional groups and is preferably 140–1,000 more preferably 170–300 in terms of epoxy equivalent.

Component (A-2): a primary or secondary amine compound having at least one primary hydroxyl group in the molecule.

This component has a function of reacting with the component (A-1) to introduce a primary hydroxyl group and a basic group into the component (A-1).

The amine group in the component (A-2) reacts with the epoxy group of the epoxy group-containing functional group represented by the structural formula (II), in the component (A-1) to form a cationic resin. This cationic resin having primary groups and basic groups, as compared with the above-mentioned resin formed by reaction with a conventional bisphenol A type epoxy resin, is much superior in dispersibility in water and throwing property even in a partially neutralized state or at a high pH, and the film formed therewith shows no reduction in curability, corrosion resistance, etc.

The component (A-2) can be exemplified by the following compounds.

(1) Primary alkanolamines such as monoethanolamine, monopropanolamine, monobutanolamine and the like.

(2) Secondary alkanolamines such as N-methylethanolamine, N-ethylethanolamine, diethanolamine, di-n (or iso)-propanolamine, dibutanolamine and the like.

(3) Adducts between the above primary alkanolamine and αβ-unsaturated carbonyl compound, which are secondary alkanolamines. For example, monoethanolamine-N,N-dimethylaminopropylacrylamide adduct, monoethanolamine-hydroxyethyl (meth)acrylate adduct, monoethanolamine-hydroxypropyl (meth)acrylate adduct and monoethanolamine-hydroxybutyl (meth)acrylate adduct.

(4) Primary and secondary alkanoldiamines such as hydroxyethylaminoethylamine and the like.

(5) Condensates between at least one compound selected from hydroxyamine, hydroxyethylhydrazine and hydroxyethylhydrazine and a ketone compound (e.g. dimethyl ketone, methyl ethyl ketone, methyl isobutyl ketone, dibutyl ketone, dipropyl ketone), which are secondary alkanolamines.

(6) Amine compounds having a primary hydroxyl group, a secondary amino group and an amino group in the molecule, represented by the following general formula (XVII)

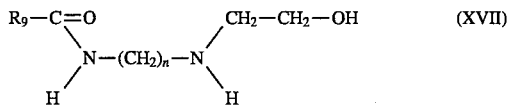

wherein n is an integer of 1–6, and

R$_9$ represents a hydrocarbon chain of 4–36 carbon atoms which may have a hydroxyl group and/or a polymerizable unsaturated group.

The amine compound represented by the above formula (XVII) can be obtained, for example, by subjecting about one mole of an N-hydroxyalkylalkylenediamine and about one mole of a monocarboxylic acid of 5–37 carbon atoms to a dehydration and condensation reaction. The diamine includes, for example, hydroxyethylaminoethylamine, N-hydroxyethylpropylenediamine, N-hydroxyethylbutylenediamine, N-hydroxyethylpentylenediamine and N-hydroxyethylhexylenediamine. The monocarboxylic acid includes, for example, mixed fatty acids such as coconut oil fatty acid, castor oil fatty acid, rice bran oil fatty acid, soybean oil fatty acid, tall oil fatty acid, B dehydrated castor oil fatty acid, safflower oil fatty acid, linseed oil fatty acid, tung oil fatty acid and the like; caprylic acid; capric acid; lauric acid; myristic acid; palmitic acid; stearic acid; oleic acid; ricinoleic acid; linolic acid; linolenic acid; eleostearic acid; 12-hydroxystearic acid; and behenic acid.

The reaction between the diamine and the monocarboxylic acid for obtaining an amine compound represented by the structural formula (XVII) is conducted, for example, by mixing the two components in about equal moles, removing a given amount of the generated water with an organic solvent such as toluene, methyl isobutyl ketone or the like, and removing the remaining organic solvent by a reduced pressure method or the like to obtain an intended amine compound. The thus obtained amine compound preferably has an amine (secondary amine) value of generally 88–350, particularly 12–230 and a hydroxyl (primary hydroxyl) value of generally 44–350, particularly 60–230.

On the compounds (1) to (6) each as the component (A-2), there are preferred the secondary alkanolamines (2), (3) and (6). Combined use of a hydroxyethylaminoethyl fatty acid amide represented by the general formula (XVII) and diethanolamine is particularly preferable because it can improve the smoothness and corrosion resistance of coating film surface. The proportions of the two components are preferably 30–80% by weight (the former component) and 20–70% by weight (the latter component) based on the total weight of the two components.

Component (A-3): a phenol compound having at least one phenolic hydroxyl group in the molecule.

As said phenol compound, there can be mentioned, for example, polyphenol compounds such as bis(4-hydroxyphenyl)-2,2-propane, 4,4'-dihydroxybenzophenone, bis(4-hydroxyphenyl)-1,1-ethane, bis(4-hydroxyphenyl)-1,1-isobutane, bis(4-hydroxy-tert-butylphenyl)-2,2-propane, bis(2-hydroxynaphthyl)methane, 1,5-dihydroxynaphthalene, bis(2,4-dihydroxyphenyl)methane, tetra(4-hydroxyphenyl)-1,1,2,2-ethane, 4,4'-dihydroxydiphenyl ether, 4,4'-dihydroxydiphenylsulfone, phenol novolac, cresol novolac and the like. There can also be used monophenol compounds such as phenol, nonylphenol, α- or β-naphthol, p-tert-octyl phenol, o- or p-phenylphenol and like.

In order to form a coating film of higher corrosion resistance, it is preferable that there be used, as the component (A-3), particularly a bisphenol resin derived from a bisphenol compound such as bisphenol A [bis(4-hydroxyphenyl)-2,2-propane], bisphenol F [bis(4-hydroxyphenyl)-2,2-methane] or the like. Particularly suitable as such a bisphenol resin is one having a number-average molecular weight of at least 200, preferably about 800–about 3,000 and, on an average, two or less, preferably 0.8–1.2 phenolic hydroxyl groups in the molecule, represented by the following general formula (XVIII):

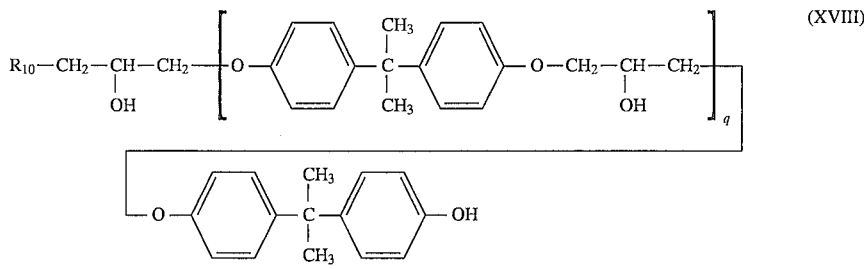

(XVIII)

wherein q is an integer of 0–7 on an average, and $R_{10}$ is a residue of an active-hydrogen-containing compound.

As the active-hydrogen-containing compound which is a precursor of the $R_{10}$ of the above formula, there can be mentioned, for example, amines such as secondary amine and the like; phenols such as phenylphenol, nonylphenol and the like; organic acids such as fatty acid and the like; thiols; alcohols such as alkyl alcohol, cellosolve, butyl cellosolve, carbitol and the like; and inorganic acids. Of these compounds, most preferable are dialkanolamines which are each a secondary amine having a primary hydroxyl group; phenols such as nonylphenol, phenylphenol, phenol, hydroquinone monomethyl ether and the like; higher fatty acids such as stearic acid, oleic acid, soybean oil fatty acid and the like; organic acids such as acetic acid, formic acid, hydroxyacetic acid and the like; and so forth.

The above formula (XVIII) representing the component (A-3) has $R_{10}$—and —OH at the two ends. However, the component (A-3) may also include a compound having only $R_{10}$— and —OH at the two ends.

The component (A-3) can be obtained, for example, by reacting about one mole of a polyepoxide of bisphenol A diglycidyl ether type having a molecular weight of 200 or more, preferably 380–2,000, about one mole of a polyphenol of bisphenol A type having a molecular weight of at least 200, preferably 200–2,000 and about one mole of an active-hydrogen-containing compound, for example, a secondary dialkanolamine in the presence of a catalyst and a solvent as necessary, at a temperature of 30°–300° C., preferably 70°–180° C. The above molar ratio is merely illustrative and not restrictive, and can be determined as desired.

The component (A-3) may also be obtained by reacting the above phenolic compound with a polyol (e.g. dimerdiol, ethylene glycol, propylene glycol or butylene glycol), a polyether polyol (e.g. polyethylene glycol, polypropylene glycol or polybutylene glycol), a polyester polyol (e.g. polycaprolactone), a polycarboxylic acid, a polyisocyanate, a monoisocyanate, an oxide of an unsaturated compound (e.g. ethylene oxide, propylene oxide, butylene oxide or styrene oxide), a glycidyl ether of a hydroxyl group-containing compound (e.g. allyl glycidyl ether, polypropylene glycol diglycidyl ether, 2-ethylhexyl glycidyl ether, methyl glycidyl ether, butyl glycidyl ether or phenyl glycidyl ether), a glycidyl ester of an organic acid such as fatty acid or the like, a compound having an alicyclic oxirane group, or the like. The component (A-3) also includes compounds obtained by graft-polymerizing δ-4-caprolactone, an acrylic monomer or the like to the above phenolic compound.

The reaction between the component (A-1), the component (A-2) and the component (A-3) can be conducted by any ordinary process and the reaction order thereof is not particularly restricted. The reaction can be conducted generally at 50°–300° C., preferably 70°–200° C. For example, the component (A-1) and the component (A-3) are reacted and then the component (A-2) is reacted.

It is also possible that a polyepoxide and a polyphenol, both of which are raw materials of the component (A-3) having a phenolic hydroxyl group, be reacted in the presence of the component (A-1) and the component (A-2) to save the step for production of the component (A-3).

It is also possible that the component (A-3) be used in an excess, the component (A-1) be reacted with part of the component (A-2), and the unreacted portion in the component (A-3) be reacted with other polyepoxide.

The proportions of the components (A-1), (A-2) and (A-3) used can be determined as desired.

The component (A-1), even when contained in a small amount in the presence resin composition for cationic electrocoating, can significantly improve the dispersibility in water and throwing property of said cationic electrocoating. Hence, the amount of the component (A-1) can be 0.5–95% by weight, preferably 3–75% by weight, particularly preferably 5–50% by weight based on the total amount of the components (A-1), (A-2) and (A-3).

In the component (A) of the present invention, the content of cationic group(s) is desirably a level enabling the stable dispersion of the resin (A) in water and yet being low. Preferably, the content is generally 3–200, particularly 5–180 in terms of amine value expressed in KOH mg per g of solid content. Even when the content of the cationic group(s) is less than 3, dispersion in water is possible by the use of a surfactant or the like. In this case, however, the cationic group(s) is (are) desirably controlled so that the resulting aqueous dispersion has a pH of 4–9, preferably 6–7.

Further, in the component (A), preferably the content of the primary hydroxyl group formed by the reaction between the component (A-2) and the epoxy group-containing functional groups of the structural formula (II) in the component (A-1) is generally 10–1,000, particularly 50–700 in terms of hydroxyl value of said primary hydroxyl groups, in view of the reactivity with curable functional groups.

Preferably, the component (A-3) is used in an amount of 95% by weight or less, preferably 20–90% by weight based on the total amount of the components (A-1), (A-2) and (A-3) because it can impart a bisphenol skeleton and high corrosion resistance.

In the reaction of the components (A-1), (A-2) and (A-3), a cationizing agent other than the component (A-2) may be used together therewith as necessary. As such a cationizing agent, there can be mentioned, for example, primary amines such as methylamine, ethylamine, n- or isopropylamine and the like; secondary amines such as diethylamine, dipropylamine, dibutylamine and the like; and polyamines such as ethylenediamine, diethylenetriamine, ethylaminoethylamine, methylaminopropylamine, dimethylaminoethylamine, dimethylaminopropylamine and the like. As the other cationizing agent, there can also be used ammonia, hydrazine, N-hydroxyethylimidazoline, etc. These cationizing agents preferably form a tertiary amino group after the reaction with the component (A-1).

As the other cationizing agent, there can be further used tertiary amines such as triethylamine, triethanolamine, N,N-dimethylethanolamine, N-methyldiethanolamine, N,N-diethylethanolamine, N-ethyldiethanolamine and the like. These tertiary amines can be quaternized by protonation with an acid and subsequent reaction with epoxy groups.

As the other cationizing agent, there can be used, besides the above-mentioned amino compounds, a tertiary sulfonium salt obtained by reacting a salt between a sulfide (e.g. diethyl sulfide, diphenyl sulfide, tetramethylene sulfide or thiodiethanol) and boric acid, carbonic acid, an organic monocarboxylic acid or the like, with epoxy groups.

As the other cationizing agent, there can also be used a quaternary phosphonium salt obtained by reacting a salt between a phosphine (e.g. triethylphosphine, phenyldimethylphosphine, diphenylmethylphosphine or triphenylphosphine) and an acid such as mentioned above, with epoxy groups.

In the present invention, it is necessary to introduce cationic group(s) into the resin (A) by using the component (A-2). In this case, the use of the above-mentioned cationizing agent(s) other than the component (A-2) is optional.

The component (A) has excellent dispersibility in water and, when added to an organic or inorganic substance which has no or only slight dispersibility in water, allows the substance to have high dispersibility in water. Therefore, the present resin composition for aqueous coating may be added to conventional cationic electrocoatings for their improvement in dispersibility in water.

The film formed with a cationic electrocoating comprising the above-mentioned hydroxyl group-containing cationic resin (A) of the present invention can be cured by heating in the presence of a component (B) described below.

Component (B) a novolac-substituted phenol type epoxy resin represented by the following general formula (I)

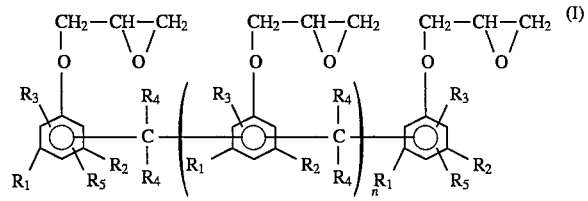

wherein $R_1$s and $R_2$s may be the same or different and are each a group selected from a hydrogen atom, an alkyl group of 1–8 carbon atoms, an aromatic group and a halogen atom, $R_3$s may be the same or different and are each a group selected from an alkyl group of 1–10 carbon atoms, an aromatic group, an aryl group and a halogen atom, $R_4$s may be the same or different and are each a group selected from a hydrogen atom and an alkyl group of 1–4 carbon atoms, $R_5$s may be the same or different and are each a group selected from a hydrogen atom, an alkyl group of 1–10 carbon atoms, an aromatic group, an aryl group and a halogen atom, n is an integer of 0–38, and part of the benzene rings in the formula may be replaced by naphthalene ring(s).

In the above general formula (I), specific examples of each $R_1$ and each $R_2$ are a hydrogen atom, a methyl group, an ethyl group, a phenyl group, a benzyl group, a chlorine atom, a bromine atom and an iodine atom; preferably, a hydrogen atom, a methyl group, a chlorine atom and a bromine atom; more preferably, a hydrogen atom, a methyl group and a bromine atom.

Specific examples of each $R_3$ are a methyl group, an ethyl group, a n-butyl group, a tert-butyl group, a pentyl group, a hexyl group, a nonyl group, a phenyl group, a benzyl group, a propenyl group, a chlorine atom, a bromine atom and an iodine atom. Of these, preferable are a methyl group, a tert-butyl group, a nonyl group, a phenyl group, a propenyl group, a chlorine atom, a bromine atom, etc., and particularly preferable are a methyl group, a tert-butyl group, a phenyl group, a bromine atom, etc.

Specific examples of each $R_4$ are a hydrogen atom, a methyl group, an ethyl group and a propenyl group. Of these, preferable is a hydrogen atom.

Each $R_5$ specifically includes a hydrogen atom, a methyl group, an ethyl group, a n-butyl group, a tertbutyl group, a pentyl group, a hexyl group, a nonyl group, a phenyl group, a benzyl group, a propenyl group, a chlorine atom, a bromine atom and an iodine atom, etc. Of these, preferable are a methyl group, a tert-butyl group, a nonyl group, a phenyl group, a propenyl group, a chlorine atom, a bromine atom, etc., and particularly preferable are a methyl group, a tert-butyl group, a phenyl group, a bromine atom, etc.

The repeating unit n is preferably 0–38, particularly preferably 3–25. An n exceeding 38 is not preferable because it gives a high viscosity and tends to reduce the surface smoothness of coating film.

The component (B) preferably has a number-average molecular weight of generally about 400–about 8,000, particularly 1,000–3,000 as measured by vapor-pressure osmometry and an epoxy equivalent of 180–2,000 or, particularly, 180–500.

The component (B) is useful as a curing agent for the component (A) and can be obtained, for example, by polycondensing a bifunctional phenol compound represented by the following general formula (XIX)

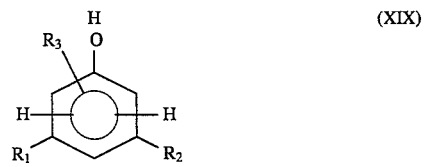

[$R_1$, $R_2$ and $R_3$ have the same definitions as given with B respect to the general formula (I)] and an aldehyde compound represented by general formula $R_4CHO$ or a ketone compound represented by general formula $R_4COR_4$ [$R_4$ have the same definitions as given with respect to the general formula (I)] to obtain a novolac-substituted phenol resin and reacting this resin with an epihalohydrin to introduce glycidyl ether groups.

In the above reaction, it is possible to add, as a terminal-treating agent, a monofunctional phenol compound represented by the following general formula (XX)

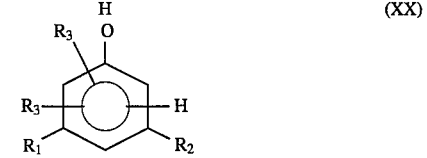

wherein $R_1$, $R_2$ and $R_3$ have the same definitions as given with respect to the general formula (I).

The bifunctional phenol compound represented by the general formula (XIX) is a compound having two active hydrogen atoms (not including hydroxyl group) bonding to one benzene nucleus, which active hydrogen atoms are capable of polycondensing with an aldehyde compound represented by general formula $R_4CHO$ or a ketone compound represented by general formula $R_4COR_4$. Specific examples of the bifunctional phenol compound are p-propenylphenol, o-benzylphenol, 6-n-amyl-n-cresol, o-cresol, p-cresol, o-ethylphenol, o-phenylphenol, p-phenylphenol, p-tert-pentylphenol, p-tert-butylphenol, o-chlorophenol, 4-chlorophenol, 3,5-xylenol, o-allylphenol, p-nonylphenol, o-bromophenol, p-cumylphenol, α-naphthol and β-naphthol.

The monofunctional phenol compound represented by the general formula (XX) is a compound having one active hydrogen atom bonding to one benzene nucleus, which active hydrogen atom is the same kind as explained with respect to the bifunctional phenol compound represented by the general formula (XIX). The monofunctional phenol compound includes, for example, 2-tert-butyl-4methylphenol, 2,4-xylenol, 2,6-xylenol, 2,4-dichlorophenol, 2,4-dibromophenol, dichloroxylenol, dibromoxylenol, 2,4,5-trichlorophenol and 6-phenyl-2-chlorophenol.

The aldehyde compound represented by the general formula $R_4CHO$ includes, for example, formaldehyde and acetaldehyde. The ketone compound represented by general formula $R_4COR_4$ includes, for example, acetone, methyl ethyl ketone and methyl isobutyl ketone.

The novolac-substituted phenol resin in the component (B) can be produced by polycondensing the bifunctional phenol compound, the aldehyde compound or the ketone compound and, as necessary, the monofunctional phenol compound. It is possible to polycondense the monofunctional phenol compound and the aldehyde compound or the ketone compound to produce a diphenol compound. In these productions, there can be used an ordinary process for producing a novolac-substituted phenol resin, for example, a batchwise process or a continuous process described in, for example, Japanese Laid-Open Patent Application No. 130498/1976. For example, the above components are used in such proportions that the n in the general formula (I) falls in the range of 0–38 and becomes an intended value; there is used, as a catalyst, an inorganic acid (e.g. hydrochloric acid, phosphoric acid or sulfuric acid), an organic acid (e.g. paratoluenesulfonic acid or oxalic acid), a metal salt (e.g. zinc acetate) or the like; and polycondensation is conducted.

The component (B) can be obtained by reacting the novolac-substituted phenol resin with an epihalohydrin or the like to convert into a glycidyl ether. This conversion into a glycidyl ether can be conducted, for example, by dissolving the novolac-substituted phenol resin in an epihalohydrin, adding to the solution an aqueous alkali metal hydroxide solution continuously, and removing the water and unreacted epihalohydrin present in the reaction system by distillation. The epihalohydrin can be separated from the distillate for reuse. This reaction is preferably conducted in the presence of an ether type solvent such as dioxane, diethoxyethane or the like.

Part of the glycidyl (epoxy) groups in the component (B) used in the present invention may be modified with an active-hydrogen-containing compound. Such an active-hydrogen-containing compound includes compounds having no basic group, such as phenols (e.g. bisphenol A, bisphenol F, phenylphenol, nonylphenol and phenol), fatty acids (e.g. dimer acid, stearic acid, oleic acid, tall oil fatty acid and soybean oil fatty acid), organic acids (e.g. acetic acid, formic acid and hydroxyacetic acid) and alcohols (e.g. alkyl alcohol, cellosolve and carbitol). Phenols, fatty acids and alcohols are particularly preferable. In order to conduct the modification quickly, zinc borofluoride, tetramethylammonium chloride or the like is preferably used as a catalyst. The degree of the modification is preferably about 1–3 moles of active-hydrogen-containing groups per one mole of the molecule determined from number-average molecular weight. The epoxy equivalent of the component (B) after modification is preferably 200–2,000, particularly preferably 200–500.

Examples of the compound (B) wherein part of the benzene nuclei is replaced by naphthalene ring(s), include, for example, a resin represented by the following general formula (XX)

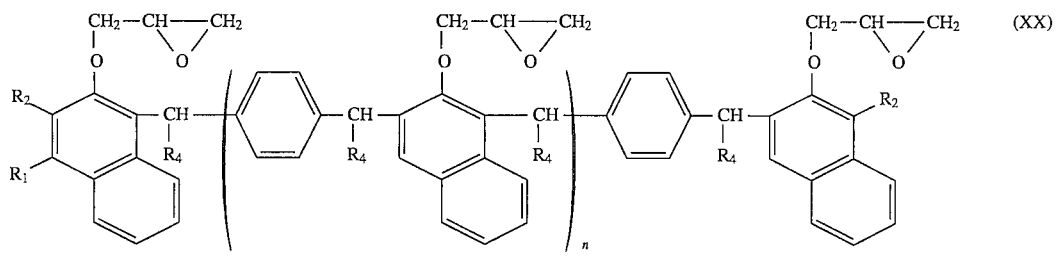

wherein each $R_1$, each $R_2$, each $R_4$ and n have the same definitions as given with respect to the general formula (I).

Some of such components (B) are commercially available and include, for example, a polyglycidyl ether of cresol novolac phenol, known under the trade names of EPICRON N-6950 (a product of DAINIPPON INK & CHEMICALS, INC.) ECON-1020 and ECON-104S (a product of Nippon Kayaku CO., LTD.), ESCN-195XHH (a product of SUMITOMO CHEMICAL CO., LTD.) etc.; a polyglycidyl ether of bromine-modified novolac phenol, known under the trade names of BREN-S (a product of Nippon Kayaku Co., Ltd.), etc.; a naphthalene type epoxy resin known under the trade names of ESN-195 (a product of Shin Nittetsu Kagaku K.K.), etc.; and a polyglycidyl ether of long-chain-alkyl-modified novolac phenol, known under the trade names of ESMB-260 (a product of SUMITOMO CHEMICAL CO., LTD.), etc. A novolac-substituted polyglycidyl ether such as a polyglycidyl ether of cresol novolac phenol, obtained by using, as a raw material, a bifunctional phenol single system, may be modified with a phenol, a fatty acid, an alcohol or the like to control the epoxy group concentration.

Resin composition for aqueous coating

The resin composition for aqueous coating according to the present invention can be obtained by neutralizing part or the whole of the basic groups in the component (A), with an acid component, mixing the neutralized component (A) with the component (B), and dissolving or dispersing the mixture in water. This neutralization can be conducted before or after the mixing of the components (A) and (B). The acid component used for neutralization includes, for example, formic acid, acetic acid, lactic acid, butyric acid and propionic acid.

In the resin composition for aqueous coating, the mixing ratio of the component (A) and the component (B) can be approximately selected depending upon the application of the resin composition, but the ratio of the component (A)/the component (B) is preferably in the range of generally 30/70 to 90/10, particularly 50/50 to 80/20 by solid content weight.

The resin composition for aqueous coating according to the present invention preferably comprises an organometal type curing catalyst [a component (C)] comprising at least one organometal compound containing a metal selected from lead, zirconium, cobalt, aluminum, manganese, copper, zinc, iron, bismuth and nickel, in order to allow the crosslinking and curing reaction between the component (A) and the component (B) to proceed quickly at low temperatures.

The organometal compound used in the component (C) includes, for example, an organic chelate compound and an organic ester compound each containing the above-mentioned metal.

The organic chelate compound includes, for example, acetylacetone type chelate compounds such as zirconium acetylacetonate, cobalt acetylacetonate, aluminum acetylacetonate, manganese acetylacetonate, iron acetylacetonate and the like; and chelation products between a compound having a β-hydroxyamino structure and lead (II) oxide. The organic ester compound includes, for example, organolead compounds such as lead 2-ethylhexanoate, lead dimethylhexanoate, lead naphthenate, lead octenoate, lead benzoate, lead acetate, lead lactate, lead formate, lead glycolate and the like; organozirconium compounds such as zirconium octenoate, zirconium acetate, zirconium formate and the like; organocobalt compounds such as cobalt octenoate, cobalt acetate, cobalt formate and the like; organomanganese compounds such as manganese acetate, manganese formate and the like; organocopper compounds such as copper octenoate, copper acetate, copper formate and the like; organozinc compounds such as zinc octenoate, zinc acetate, zinc formate and the like; organobismuth compounds such as bismuth octenoate and the like; and organonickel compounds such as nickel acetate, nickel formate and the like.

The component (C) can be mixed with the component (A) beforehand, or can be added when the component (A) and the component (B) are mixed, or may be added when the pigment(s) (mentioned after) is (are) added. The amount of the component (C) used can be varied as desired, depending upon the application of the resulting resin composition, but preferably is generally 10% by weight or less, particularly 0.2–5% by weight based on the total solid content weight of the component (A) and the component (B).

The present resin composition for aqueous coating can be used as a main or auxiliary component for film formation, in an aqueous coating using water as a solvent or a dispersing medium. It can be used particularly preferably as a main or auxiliary component for film formation, in a cationic electrocoating. In such use, the present resin composition for aqueous coating can exhibit technical advantages such as mentioned above.

The preparation of a cationic electrocoating from the present resin composition for aqueous coating can be conducted by a per-se-known method. It can be conducted, for example, by neutralizing the resin composition with an acid component as mentioned above and diluting the neutralized resin composition with water to a desired concentration.

The present resin composition for aqueous coating and the present cationic electrocoating can further comprise, as necessary, various pigments. As the pigments, there can be specifically mentioned inorganic color pigments such as carbon black, titanium white, white lead, lead oxide, red iron oxide and the like; extender pigments such as clay, talc and the like; inorganic anticorrosion pigments such as strontium chromate, lead chromate, basic lead chromate, red lead, lead silicate, basic lead silicate, lead phosphate, basic lead phosphate, lead tripolyphosphate, lead silicochromate, chrome yellow, lead cyanamide, calcium plumbate, lead suboxide, lead sulfate, basic lead sulfate and the like; and so forth. The present resin composition for aqueous coating and the present cationic electrocoating can furthermore comprise dispersing agents, anticissing agents, etc.

The method of electrocoating using a cationic electrocoating comprising the present resin composition for aqueous coating is not strictly restricted and the application can be conducted under the conditions employed ordinarily. For example, the concentration (solid content) of the electrocoating bath is controlled in the range of 5–40% by weight, preferably 10–25% by weight and the pH is controlled at 5–8, preferably 5.5–7. Appropriately, the bath temperature is 20°–35° C., preferably 25°–30° C.; the current density is 0.005–2 A/cm$^2$, preferably 0.01–1A/cm$^2$; the voltage is 10–500 V, preferably 100–300 V; and the time of flowing electricity is 0.5–10 minutes, preferably 2–4 minutes. The appropriate film thickness of electrocoating is not strictly restricted but is generally 3–200μ in terms of cured film thickness. It is preferable that after coating, the coated article be pulled up from the electrocoating bath, water-washed, air-dried as necessary and subjected to thermal curing at 70°–250° C., preferably 120°–160° C.

EXAMPLES

Next, the present invention is described more specifically by way of Examples and Comparative Examples. Percent (%) and parts appearing after each numerical figure are by weight unless otherwise specified.

I. Production Examples (I-1) Production of components (A-2) used in preparation of component (A)

(A-2-1):

Into a flask equipped with a stirrer, a thermometer, a dropping funnel and a reflux condenser were fed 288 parts of tall oil fatty acid, 104 parts of hydroxyethylaminoethylamine and 80 parts of toluene. They were slowly heated with stirring, and 18 parts of the water generated was removed. The remaining toluene was also removed under reduced pressure to obtain an amine compound (A-2-1) having a primary hydroxyl group. The compound had an amine value of 149, a solidification point of 50° C. and a hydroxyl value of 149.

(A-2-2):

39 Parts of monoethanolamine was fed into a flask equipped with a stirrer, a thermometer, a dropping funnel and a reflux condenser. Thereto was dropwise added 100 parts of N,N-dimethylaminopropylacrylamide with the flask inside temperature kept at 60° C. A reaction was conducted at 60° C. for 5 hours to obtain an amine compound (A-2-2).

(I-2) Production of components (A)

(A-i):

Into a flask equipped with a stirrer, a thermometer, a dropping funnel and a reflux condenser were fed 900 parts of EHPE-3150 (trade name) as component (A-1) [a product of Daicel Chemical Industries, Ltd. obtained by epoxidizing the vinyl groups of a ring-opening polymer of 4-vinylcyclohexene-1-oxide; epoxy equivalent=180; polymerization degree=5–25 on an average], 200 parts of ethylene glycol monobutyl ether, 315 parts of diethanolamine as component (A-2) and 370 parts of an amine compound (A-2-1). They were slowly heated with stirring for dissolution and reacted at 140° C. After it was confirmed that an epoxy equivalent of 1,585 was obtained, 2,052 parts of bisphenol A as component (A-3) was added. A reaction was conducted at 150° C. for 5 hours, and it was confirmed that no epoxy group remained.

Then, there were added 420 parts of diethanolamine as component (A-2), 4,370 parts of bisphenol A diglycidyl ether having an epoxy equivalent of 190 as component (A-3), 740 parts of an amine compound (A-2-1) and 2,092 parts of ethylene glycol monobutyl ether. A reaction was conducted at 150° C. for 5 hours, and it was confirmed that no epoxy group remained, whereby a resin (A-i) was obtained which had a solid content of 80%, an amine value of 61 and a primary hydroxyl group equivalent of 540.

(A-ii):

Into a flask equipped with a stirrer, a thermometer, a dropping funnel and a reflux condenser were fed 900 parts of EHPE-3150 (trade name) as component (A-1) [a product of Daicel Chemical Industries, Ltd.; epoxy equivalent =180], 200 parts of ethylene glycol monobutyl ether, 420 parts of diethanolamine as component (A-2) and 2,052 parts of an bisphenol A as component (A-3). They were slowly heated with stirring and reacted at 140° C. It was confirmed that no epoxy group remained.

Then, there were added 630 parts of diethanolamine as component (A-2), 3,990 parts of bisphenol A diglycidyl ether having an epoxy equivalent of 190 as component (A-3), 760 parts of polypropylene glycol diglycidyl ether having an epoxy equivalent of 380 as component (A-3) and 1,988 parts of ethylene glycol monobutyl ether. A reaction was conducted at 150° C. for 5 hours, and it was confirmed that no epoxy group remained, whereby a resin (A-ii) was obtained which had a solid content of 80%, an amine value of 64 and a primary hydroxyl group equivalent of 438.

(A-ill):

Into a flask equipped with a stirrer, a thermometer, a dropping funnel and a reflux condenser were fed 21 parts of diethanolamine, 950 parts of bisphenol A diglycidyl ether having an epoxy equivalent of 190, 340 parts of polypropylene glycol diglycidyl ether having an epoxy equivalent of 340 and 456 parts of bisphenol A. They were slowly heated with stirring and reacted at 120° C. After it was confirmed that an epoxy equivalent of 980 was obtained, 492 parts of ethylene glycol monobutyl ether was added. While the system was kept at 100° C., 158 parts of diethanolamine and 43 parts of an amine compound (A-2-2) were added. A reaction was conducted until there was no viscosity increase, whereby a resin (A-iii) was obtained which had a solid content of 80%, an amine value of 57 and a primary hydroxyl group equivalent of 532.

(I-3) Production of components (B)

(B-1):

Into a flask equipped with a stirrer, a thermometer and a reflux condenser were fed 1,917 parts of EPICLON N-695 (a product of DAINIPPON INK & CHEMICALS, INC., epoxy equivalent=213, n=7), 590 parts of ethylene glycol monobutyl ether, 440 parts of nonylphenol (an active-hydrogen-containing compound) and 0.2 part of tetramethylammonium chloride. The mixture was subjected to a reaction at 150° C. until an epoxy equivalent of 350 was obtained, whereby a resin (B-1) was obtained.

(B-2):

Into a flask equipped with a stirrer, a thermometer and a reflux condenser were fed 1,917 parts of EPICLON N-695 (a product of DAINIPPON INK & CHEMICALS, INC., epoxy equivalent=213, n=7), 620 parts of ethylene glycol monobutyl ether, 560 parts of tall oil fatty acid (an active-hydrogen-containing compound) and 0.2 part of tetramethylammonium chloride. The mixture was subjected to a reaction at 150° C. until an epoxy equivalent of 370 was obtained, whereby a resin (B-2) was obtained.

(B-3):

Into a flask equipped with a stirrer, a thermometer and a reflux condenser were fed 100 parts of EPICLON N-695 (a product of DAINIPPON INK & CHEMICALS, INC., epoxy equivalent=213, n=7) and 25 parts of ethylene glycol monobutyl ether. The mixture was heated for dissolution, whereby a resin (B-3) was obtained.

(B-4):

Into a flask equipped with a stirrer, a thermometer and a reflux condenser were fed 100 parts of BREN-S (a product of Nippon Kayaku Co., Ltd., epoxy equivalent=280, n=2) and 25 parts of ethylene glycol monobutyl ether. The mixture was heated for dissolution, whereby a resin (B-4) was obtained.

(B-5):

Into a flask equipped with a stirrer, a thermometer and a reflux condenser were fed 100 parts of ESMB-260 (a product of SUMITOMO CHEMICAL CO., LTD., epoxy equivalent=260) and 25 parts of ethylene glycol monobutyl ether. The mixture was heated for dissolution, whereby a resin (B-5) was obtained.

(B-6):

Into a flask equipped with a stirrer, a thermometer and a reflux condenser were fed 100 parts of ESN-195 (a product of Shin Nittetsu Kagaku K.K., epoxy equivalent=290) and 25 parts of ethylene glycol monobutyl ether. The mixture was heated for dissolution, whereby a resin (B-6) was obtained.

(B-7):

Into a flask equipped with a stirrer, a thermometer and a reflux condenser were fed 122 parts of 2,6-xylenol (a monofunctional phenol compound), 54 parts of o-cresol (a bifunctional phenol compound), 28 parts of a 7.6% aqueous formaldehyde solution and 4 parts of p-toluenesulfonic acid. The mixture was heated to 100° C. and subjected to a reaction for 4 hours with refluxing. Then, 300 parts of toluene and 8.4 parts of a 10% aqueous NaOH solution were added. The resulting mixture was stirred and then subjected to layer separation. The toluene layer was concentrated under reduced pressure to obtain 164 parts of a novolac which was a co-condensation product between 2,6-xylenol and o-cresol.

Then, 750 parts of epichlorohydrin was added. The mixture was heated to 100° C., and thereto was dropwise added 120 parts of a 50% aqueous NaOH solution in 5 hours to give rise to a reaction. The water in the system was removed by azeotropy with epichlorohydrin. After the completion of the reaction, excessive epichlorohydrin was removed under reduced pressure. The product obtained was dissolved in 300 parts of toluene; the salt as a by-product was removed by separation; and toluene was removed under reduced pressure to obtain 200 parts of a novolac glycidyl ether resin in which 2,6-xylenol and o-cresol were co-condensed. The resin had an epoxy equivalent of 210.

Into a flask equipped with a stirrer, a thermometer and a reflux condenser were fed 100 parts of above-synthesized novolac epoxy in which 2,6-xylenol and o-cresol were co-condensed, and 25 parts of ethylene glycol monobutyl ether. The mixture was heated for dissolution, whereby a resin (B-7) was obtained.

(B-8): (for comparison)

Into a flask equipped with a stirrer, a thermometer and a reflux condenser were fed 100 parts of EHPE-3150 (a product of Daicel Chemical Industries, Ltd., epoxy equivalent=180, number-average molecular weight=about 900) and 25 parts of ethylene glycol monobutyl ether. The mixture was heated for dissolution, whereby a resin (B-8) was obtained.

(B-9): (for comparison)

Into a flask equipped with a stirrer, a thermometer and a reflux condenser were fed 100 parts of DEN-438 [a product of Dow Chemical Co., Ltd., epoxy equivalent=180 , n=2, each $R_3$ and each $R_5$ in the general formula (I) were both a hydrogen atom] and 25 parts of ethylene glycol monobutyl ether. The mixture was heated for dissolution, whereby a resin (B-9) was obtained.

(B-10): (for comparison)

Into a flask equipped with a stirrer, a thermometer and a reflux condenser were fed 100 parts of Epicoat 828 [a product of Shell Epoxy Co., Ltd., epoxy equivalent=190, n=0, each $R_3$ and each $R_5$ in the general formula (I) were both a hydrogen atom] and 25 parts of ethylene glycol monobutyl ether. The mixture was heated for dissolution, whereby a resin (B-10) was obtained.

(B-11): (for comparison)

Into a flask equipped with a stirrer, a thermometer and a reflux condenser was fed 250 parts of diphenylmethane diisocyanate. It was heated to 80° C., and thereto was dropwise added a mixture consisting of 130 parts of 2-ethylhexyl alcohol and 134 parts of diethylene glycol monoethyl ether in 60 minutes. The resulting mixture was heated to 120° C. and, after it was confirmed by IR that there was no absorption by free NCO group, 128.5 parts of ethylene glycol monobutyl ether was added to obtain a resin (B-11).

(I-4) Production of pigment pastes (p-1)

To 10 parts of each of the above-produced components (A) were added 20 parts of titanium white (Tipaque CR 93, a product of Ishihara Sangyo Kaisha, Ltd.), 2 parts of carbon black (MA-7, a product of Mitsubishi Chemical Industries, Ltd.), 4 parts of aluminum tripolyphosphate (K White 84, a product of Teikoku Kako Co., Ltd.), 24 parts of clay (Zeeklite, a product of Zeeklite Corp., Ltd.), 0.4 part of acetic acid and 39.6 parts of deionized water. They were kneaded. Then, 200 parts of glass beads were added, and the mixture was treated by a paint shaker to obtain pigment-dispersed pastes each containing coarse particles of 10µ or less as measured by a particle gauge and having a solid content of 58%.

II. Examples and Comparative Examples

One of the components (A) and one of the components (B), both produced above, were mixed together with a neutralizing agent, as shown in Table 1. They were stirred and made into a dispersion. Thereto was added deionized water to adjust the solid content to 30%. To 333 parts of each of the thus obtained emulsions was added a mixture of 75 parts of one of the pigment pastes produced above and a catalyst. Thereto was added deionized water to adjust the solid content to 20%, whereby various cationic electrocoating were obtained.

In Comparative Example 5, 5.6 parts of dibutyltin dilaurate (tin content=18%) was further added as an additional catalyst.

Each of these cationic electrocoatings was applied onto a zinc phosphate-treated steel plate and an untreated steel plate by electrocoating (electrocoating bath temperature= 25° C., voltage=100–250 V, time of electricity flowing=3 minutes), followed by water washing and baking at 170° C. for 30 minutes and at 160° C. for 10 minutes to obtain a cured coating film.

TABLE 1

| | Component (A) | | Component (B) | | Neutralizing agent | | Catalyst | |
|---|---|---|---|---|---|---|---|---|
| | Symbol | Amount | Symbol | Amount | Name | Amount | Name | Amount |
| Example 1 | (A-i) | 87.5 | (B-1) | 37.5 | Acetic acid | 1.6 | Lead octenoate | 2.65 |
| 2 | (A-ii) | 87.5 | (B-2) | 37.5 | Acetic acid | 1.6 | Lead octenoate | 2.65 |
| 3 | (A-i) | 87.5 | (B-3) | 37.5 | Acetic acid | 1.6 | Lead octenoate | 2.65 |
| 4 | (A-ii) | 87.5 | (B-4) | 37.5 | Acetic acid | 1.6 | Lead octenoate | 2.65 |
| 5 | (A-i) | 87.5 | (B-5) | 37.5 | Formic acid | 1.2 | Zinc octenoate | 2.65 |
| 6 | (A-ii) | 87.5 | (B-6) | 37.5 | Formic acid | 1.2 | Lead octenoate | 2.65 |
| 7 | (A-ii) | 87.5 | (B-7) | 37.5 | Formic acid | 1.2 | Lead octenoate | 2.65 |
| 8 | (A-i) | 87.5 | (B-5) | 37.5 | Formic acid | 1.2 | Copper formate | 1.8 |
| 9 | (A-i) | 87.5 | (B-5) | 37.5 | Formic acid | 1.2 | Zinc formate | 1.5 |
| 10 | (A-i) | 87.5 | (B-5) | 37.5 | Formic acid | 1.2 | Nickel formate | 1.6 |
| 11 | (A-i) | 87.5 | (B-5) | 37.5 | Formic acid | 1.2 | Cobalt formate | 1.6 |
| C. Example 1 | (A-i) | 87.5 | (B-8) | 37.5 | Formic acid | 1.2 | Lead octenoate | 2.65 |
| 2 | (A-ii) | 87.5 | (B-9) | 37.5 | Formic acid | 1.2 | Lead octenoate | 2.65 |
| 3 | (A-iii) | 87.5 | (B-10) | 37.5 | Formic acid | 1.2 | Lead octenoate | 2.65 |
| 4 | (A-i) | 87.5 | (B-11) | 37.5 | Formic acid | 1.2 | Lead octenoate | 2.65 |
| 5 | (A-i) | 87.5 | (B-11) | 37.5 | Formic acid | 1.2 | Lead octenoate + dibutyltin dilaurate | 2.65+ 5.6 |

Lead octenoate: lead content = 38%
Zinc octenoate: zinc content = 18%
C. Example: Comparative Example III. Results of Performance Tests Each of the coatings obtained and the baked and cured coating films formed therewith (thickness of cured coating film=20µ) was tested for performances. The results are shown in Table 2.

TABLE 2

|  | Low-temperature curability (1) | Bath stability | | | | Heating loss (4) | Gloss retention (5) | Salt spray resistance (6) | Organotin |
|---|---|---|---|---|---|---|---|---|---|
|  |  | MEQ (2) | | Particle diameter (3) | | | | | |
|  |  | Initial | After storage | Initial | After storage | | | | |
| Example 1 | 90 | 27.5 | 25.4 | 0.15 | 0.15 | 3.2 | 92 | Pass | Not used |
| 2 | 91 | 27.7 | 25.0 | 0.12 | 0.12 | 3.6 | 92 | Pass | Not used |
| 3 | 92 | 27.4 | 24.5 | 0.10 | 0.12 | 3.2 | 97 | Pass | Not used |
| 4 | 91 | 27.1 | 23.1 | 0.10 | 0.10 | 3.3 | 92 | Pass | Not used |
| 5 | 90 | 29.8 | 28.0 | 0.13 | 0.12 | 3.7 | 90 | Pass | Not used |
| 6 | 91 | 27.9 | 25.0 | 0.14 | 0.12 | 3.5 | 97 | Pass | Not used |
| 7 | 92 | 27.5 | 26.0 | 0.10 | 0.10 | 3.3 | 90 | Pass | Not used |
| 8 | 93 | 33.2 | 30.2 | 0.12 | 0.12 | 3.0 | 90 | Pass | Not used |
| 9 | 92 | 34.0 | 30.9 | 0.13 | 0.14 | 2.9 | 93 | Pass | Not used |
| 10 | 90 | 33.8 | 31.0 | 0.14 | 0.13 | 3.1 | 92 | Pass | Not used |
| 11 | 91 | 34.2 | 32.2 | 0.12 | 0.12 | 3.2 | 92 | Pass | Not used |
| C. Example 1 | 78 | 27.5 | 27.7 | 0.10 | 0.12 | 4.1 | 92 | Fail | Not used |
| 2 | 90 | 26.4 | 8.5 | 0.15 | 0.15 | 3.2 | 97 | Pass | Not used |
| 3 | 94 | 27.2 | 5.4 | 0.30 | 0.35 | 3.3 | 90 | Pass | Not used |
| 4 | 77 | 27.3 | 26.4 | 0.15 | 0.15 | 12.3 | — | Fail | Not used |
| 5 | 94 | 27.5 | 27.7 | 0.15 | 0.15 | 15.2 | 45 | Pass | used |

C. Example: Comparative Example

Test methods]

(1) Low-temperature curability

A cationic electrocoating was coated on a zinc phosphate-treated steel plate under the conditions mentioned above. Then, baking was made at 160° C. for 10 minutes to obtain a cured-coating film (film thickness=20μ). The coated plate was immersed in acetone of 30° C. for 48 hours. A reduction in film weight before and after acetone immersion was calculated according to the following formula and reported as a gel fraction (%).

| Gel fraction = | [(weight of coated steel plate after immersion − weight of uncoated steel plate)/(weight of coated steel plate before immersion − weight of uncoated steel plate)] × 100 |
|---|---|

(2) MEQ (milliequivalent)

An emulsion having a solid content of 30%, produced in accordance with the compounding recipe of Table 1 (this emulsion contained no pigment paste) was accurately weighed in an amount of about 10 g after 12 hours (initial) from the production of the emulsion and also after the 20-day storage of the emulsion at 30° C. under tight sealing. Potentiometric titration was conducted for each emulsion using a 1/10N alcoholic KOH solution to determine the acid amount contained therein. Then, MEQ was calculated using the following formula. A case in which the difference of MEQ after storage from initial MEQ is smaller, is better.

MEQ=[(amount (ml) of alcoholic KOH solution used ×10)]/[sample amount (g)×0.3]

(3) Particle diameter

The diameter of the particle in the emulsions (initial and after storage) obtained in the same manner as in the above (2) were measured using Nanosizer N-4 manufactured by Coutler Electronics Inc.

(4) Heating loss

An electrocoating was coated on a zinc phosphate-treated steel plate (weight=Wo) by electrocoating under the above-mentioned conditions, so as to give a coating film of 20μ in thickness as cured. The coating film was dried under reduced pressure in a vacuum dryer at 80° C. for 1 hour (the weight of the coated steel plate after drying=W1). Then, baking was conducted in a dryer at 180° C. for 30 minutes (the weight of the coated plate after baking=W2). The heating loss (%) of the electrocoating used was calculated by substituting the above weights into the following formula.

Heating loss=[(W1−W2)/ (W1−Wo)]×100

(5) Gloss retention

An electrocoating was coated on a zinc phosphate-treated phate-treated steel plate by electrocoating under the above-mentioned conditions, so as to give a coating film of 20μ in thickness as cured. The coating film was heated at 170° C. for 20 minutes for curing. The resulting coated plate was subjected to accelerated exposure for 200 hours in a sunshine weatherometer (light amount=1,100 KJoule/m²·hr) to examine a change (%) in gloss (60° C. mirror reflectivity) before and after exposure. Gloss measurement was made using a digital gloss meter (Model GM-26D marketed by Murakami Color Research Laboratory). Gloss retention (%) was determined using the following formula.

Gloss retention=[(gloss after 200-hour exposure) /(gloss before exposure)]×100

(6) Salt spray resistance

An electrocoating was coated on a zinc phosphate-treated steel plate by electrocoating under the above-mentioned conditions, so as to give a coating film of 20μ in thickness as cured. The coating film was heated at 160° C. for 10 minutes for curing. The resulting coated plate was subjected to a salt spray test (1,000 hours) by JIS Z 2871. After the test, there were examined the width (one width) of the blister developed from the linear cut made in the film so as to reach the steel plate and the blister of the film appearing at the portions other than the cut. When said width was 2.00 mm or smaller and said blister was 8 F (ASTM) or below, the salt spray resistance of the electrocoating used was rated as "pass".

Industrial Applicability

The resin composition for aqueous coating according to the present invention has excellent stability in electrocoating bath and excellent low-temperature curability, requires no use of a blocked polyisocyanate compound or an organotin compound as curing agent, and is useful particularly in cationic electrocoatings.

What is claimed is:

1. A resin composition for aqueous coating characterized by comprising, as the main components (A) a resin obtained by reacting
(A-1) an epoxy resin having, in the molecule, at least three epoxy group-containing functional groups each represented by the following structural formula (II)

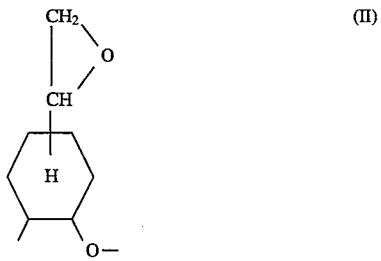

(A-2) an amino compound having at least one primary hydroxyl group in the molecule, and
(A-3) a phenol compound having one phenolic hydroxyl group in the molecule,
said resin (A) having an amine value of 3–200 in terms of KOH mg per g of said content and having the primary hydroxyl group(s) in an amount of 10–1,000 in terms of hydroxyl value, and (B) An epoxidized novolac-substituted phenolic resin having a number-average molecular weight of about 400 to about 8,000 when measured by vapor-pressure osmometry and an epoxy equivalent of 180–2,000 and represented by the following general formula (I)

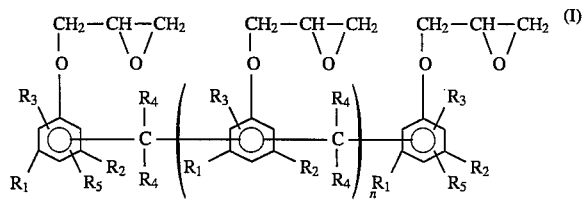

wherein $R_1$s and $R_2$s may be the same or different and are each a group selected from a hydrogen atom, an alkyl group of 1–8 carbon atoms, an aromatic group and a halogen atom, $R_3$s may be the same or different and are each a group selected from an alkyl group of 1–10 carbon atoms an aromatic group, an aryl group and a halogen atom, $R_4$s may be the same or different and are each a group selected from a hydrogen atom and alkyl group of 1–4 carbon atoms, $R_5$s may be the same or different and are each a group selected from a hydrogen atom, an alkyl group of 1–10 carbon atoms, an aromatic group, an aryl group and a halogen atom, n is an integer of 0–38, and part of the benzene rings in the formula may be replaced by naphthalene ring(s), the ratio of the component (A)/the component of (B) being 30/70 to 90/10 in terms of the weight ratio of the solid contents of the components (A) and (B).

2. A composition according to claim 1, wherein the epoxy resin (A-1) has the epoxy group-containing functional groups of structural formula (II) in an amount of 140–1,000 in terms of epoxy equivalent.

3. A composition according to claim 1, wherein the amine compound (A-2) is selected from secondary alkanolamines, adducts between primary alkanolamine and α, β-unsaturated carbonyl compound, and amine compounds represented by the following general formula (XVII)

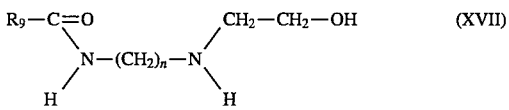

wherein n is an integer of 1–6, and
$R_9$ represents a hydrocarbon chain of 4–36 carbon atoms which may have a hydroxyl group and/or a polymerizable unsaturated group.

4. A composition according to claim 1, wherein the phenol compound (A-3) is a compound represented by the following general formula (XVIII)

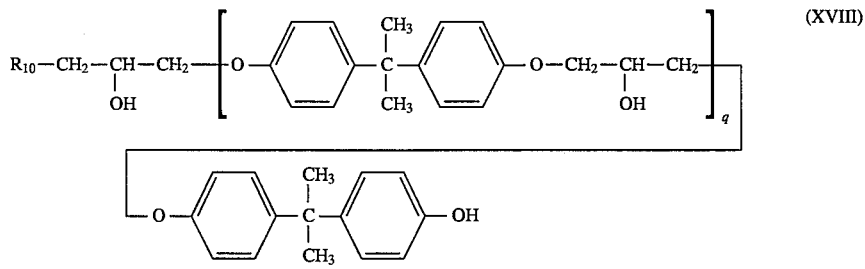

wherein q is an integer of 0–7, and
$R_{10}$ is a residual of an active-hydrogen-containing compound.

5. A composition according to claim 1, wherein the component (A-1) is used in an amount of 0.5–95% by weight based on the total amount of the components (A-1) to (A-3).

6. A composition according to claim 1, wherein the resin (B) is an epoxidized novolac-substituted phenolic resin of general formula (I), wherein
$R_1$s and $R_2$s are each a hydrogen atom, a methyl group, a chlorine atom or a bromine atom,
$R_3$s are each a methyl group, a tert-butyl group, a nonyl group, a phenyl group, a propenyl group, a chlorine atom or a bromine atom,
$R_4$s are each a hydrogen atom,
$R_5$s are each a hydrogen atom, a methyl group, a tert-butyl group, a nonyl group, a phenyl group, a propenyl group, a chlorine atom or a bromine atom, and
n is 3–25.

7. A composition according to claim 1, which further comprises an organometal catalyst comprising at least one organometal compound containing a metal selected from the group consisting of lead, zirconium, cobalt, aluminum, manganese, copper, zinc, iron, bismuth and nickel.

8. A composition according to claim 7, wherein the organometal catalyst is contained in an amount of 10% by weight or less based on the total solid content weight of the components (A) and (B).

9. A cationic electrocoating comprising a composition for aqueous coating of claim 1.

10. A coated article which is coated with a cationic electrocoating of claim 9.

11. A composition according to claim 1, wherein the resin (B) is an epoxidized novolac-substituted phenolic resin having an epoxy equivalent of 200–2,000, in which the resin (B) is modified with an active-hydrogen-containing compound having no basic group.

* * * * *